US006973191B2

(12) United States Patent
Audebert et al.

(10) Patent No.: US 6,973,191 B2
(45) Date of Patent: Dec. 6, 2005

(54) SYSTEM AND METHOD FOR GENERATING SYMMETRIC KEYS WITHIN A PERSONAL SECURITY DEVICE HAVING MINIMAL TRUST RELATIONSHIPS

(75) Inventors: Yves Louis Gabriel Audebert, Los Gatos, CA (US); Eric F. Le Saint, Fremont, CA (US)

(73) Assignee: Activcard, Suresnes Cedex (FR)

( * ) Notice: Subject to any disclaimer, the term of this patent is extended or adjusted under 35 U.S.C. 154(b) by 937 days.

(21) Appl. No.: 09/985,343

(22) Filed: Nov. 2, 2001

(65) Prior Publication Data

US 2003/0086571 A1    May 8, 2003

(51) Int. Cl.[7] .............................. H04L 9/00; H04L 9/32
(52) U.S. Cl. ...................... 380/277; 380/262; 380/278; 380/286; 713/155; 713/173; 713/200
(58) Field of Search ................................ 380/277, 278, 380/286, 262; 713/155, 156, 173, 175, 200

(56) References Cited

U.S. PATENT DOCUMENTS 6,009,177 A    12/1999  Sudia
6,230,267 B1    5/2001  Richards et al.

FOREIGN PATENT DOCUMENTS

| FR | 2786292 | 5/2000 |
| WO | 9855717 | 12/1998 |
| WO | 9919846 | 4/1999 |

OTHER PUBLICATIONS

International Search Report dated Feb. 26, 2003.
Peter Johannes, Chip Programme, "MAOS Platforms, Technical Status Report," Europay International, Apr. 10, 2000.
John Elliott, "The MAOS Trap," Consult Hyperion, 2000.
"The MULTOS Certificate Authority," Modex International, Ltd., 2000.
"The MULTOS Key Management Authority," Modex International, Ltd., 2000.
"Java Card Technology for Smart Cards, Architecture and Programmer's Guide," Zhiqun Chen, Jun. 2000, ISBN 0-201-70329-7.

Primary Examiner—Gilberto Barrón, Jr.
Assistant Examiner—Abdulhakim Nobahar
(74) Attorney, Agent, or Firm—Stevens, Davis, Miller & Mosher, LLP (57) ABSTRACT

A data processing method and system for generating a unique symmetric key inside a PSD having limited trust relationships between PSD manufacture, PSD issuer, subsequent service providers and a trusted third party.

32 Claims, 9 Drawing Sheets

SYSTEM AND METHOD FOR GENERATING SYMMETRIC KEYS WITHIN A PERSONAL SECURITY DEVICE HAVING MINIMAL TRUST RELATIONSHIPS

FIELD OF INVENTION

The present invention relates to a data processing system and method for generating cryptographic keys having minimal trust relationships with other service providers installed on a personal security device. The cryptographic keys may be used by an independent party for verification of digitals certificates, for performing authentications and for use in other applications including card management functions.

BACKGROUND OF INVENTION

The current art involving the management of cryptographic keys for use in personal security devices (PSD) including smart cards, subscriber identification modules (SIM), wireless identification modules (WIM), identification tokens and related devices requires bilateral trust relationships in the form of cryptographic key exchanges and replacements between the PSD manufacturer, PSD issuer and subsequent third party service providers.

Cryptographic key exchanges and replacements are necessary in order to securely manage proprietary information contained within the PSDs. In a commonly performed process, a PSD manufacturer will install the operating environment (e.g. JavaCard™, Multos™, Windows for Smart Cards™,) PSD serial number, native methods and specific industry extensions at the time of masking of the internal ROM. Immediately following ROM masking the manufacturer will inject an initial cryptography key into the PSD. This cryptographic key may be thought of as a high-level master key, which is used to "unlock" the PSD for resource allocation, PSD personalization, installation of third party applications and other features included in the runtime environment or available native methods.

The master key controls the card executive included in the operating environment installed in the PSD and is usually a symmetric key rather than an asymmetric key type in order to improve execution speed and reduce internal storage requirements. The PSD masking process is generally performed on a large number of PSDs in a production run. Each PSD receives a unique symmetric key that is cross-referenced by the PSD's unique serial number, which is stored in a secure database. The PSDs are then sent to the PSD issuer for personalization and distribution. The cryptographic key database or its hardcopy equivalent is likewise securely transferred to the PSD issuer usually by a courier service.

Once the PSD issuer receives the PSDs and the cryptographic keys from the manufacturer, the PSD issuer generates new unique cryptographic keys and securely replaces the PSD manufacturer's cryptographic keys with the new cryptographic keys. The new cryptographic keys generated by the PSD issuer have the same high-level authority as those of the card manufacturer, which allows installation and internal registration of additional provider services including provider specific cryptographic keys. The PSD issuer then personalizes the PSDs and establishes secure domains for installation of additional PSD applications from additional service providers. The newly formed secure domains are protected by new cryptographic keys, which are injected into the PSDs during configuration of the secure domains. As before, the secure domain specific cryptographic keys are typically symmetric to improve processing speed and minimize storage requirements.

The secure domain specific cryptographic keys are subordinate to the master keys and are used to allow access and management (add, change, delete) of information contained in a specific secure domain including key replacement but do not allow access to other secure domains which may be present in the PSD. In an issuer centric management system, the master key owned by the PSD issuer will still allow access to a secure domain for overall PSD management purposes however, the PSD security mechanisms prohibit the reading and export of private keys contained in another's secure domain. In a user centric management system, each respective service provider and the end user manage the PSD. An issuer centric PSD management system is the most commonly deployed worldwide.

In an open platform arrangement, the secure domain cryptographic keys are securely sent to each service provider in a manner analogous to the PSD manufacturer/PSD issuer key exchange. Each service provider performs a key replacement of the initial secure domain keys upon activation of their installed applications by injecting or generating new cryptographic keys and replacing the initial keys installed by the PSD issuer. Thus, a chain of trust is created between the PSD manufacturer, PSD issuer and each subsequent service provider regardless of the PSD management system employed.

One limitation in the current art in issuer centric PSD management systems is the increased dependency on the PSD issuer for assuring the authenticity and integrity of the PSD. In real world situations, a PSD issuer based on business and legal considerations would not want to be placed in a position of trust for transactions unrelated to their business interests. Typically, the trust relationship is outsourced to a third party certificate authority which uses secure domain specific information contained in the card to generate digital certificates for each service provider including the card issuer. This solution results in multiple digital certificates being generated for each PSD, none of which individually addresses the overall authenticity and integrity of the PSD from birth to current status.

Another limitation is that the trusted third party, may lack the ability to directly access the PSD, but is required to use or approve information generated by the PSD. For example, a third party certificate authority may not have access to a particular PSD, but receives a certificate presumably generated by the PSD and is reliant on the initial trust relationships in order to approve the certificate. As before, the received digital certificate has no direct relationship with other certificates residing in the PSD. It is entirely possible to receive a valid digital certificate belonging to a particular service provider even though other certificates generated by the PSD are no longer valid or even worse, the overall integrity of the card may be compromised which is not reflected in the certificate.

Therefore, what is needed is a means to generate reliable information, which securely incorporates information from birth to the present PSD state and is not restricted to individual secure domains or under the direct control of any one party. This need is the subject of this invention.

SUMMARY OF INVENTION

This invention provides a method and system for generating a composite symmetric key, which securely incorporates information from each service provider contained in a PSD and is only known to a trusted third party. The key may be used by a trusted third party certificate authority to validate a digital certificate or for authentication purposes by the trusted third party.

To practice this invention, a symmetric key generating algorithm is installed inside a PSD by the manufacturer immediately following masking but prior to injection of a first cryptographic key. This algorithm is granted secure sharing privileges, which allows access to cryptographic keys during secure replacement operations. The algorithm is designed to read either stored symmetric or private asymmetric keys as seed information to create a new symmetric key. The new composite symmetric key will be generated and stored in a designated secure domain each time a cryptographic key replacement operation is performed.

The composite symmetric keys are created using an exclusive OR arithmetic operator (XOR), which compares the existing symmetric key with a newly injected key bit by bit to create a new composite symmetric key. The first composite symmetric key created uses as inputs into the XOR operator the device serial number and manufacturer's symmetric key. The resulting composite symmetric key is then securely stored. Each subsequent key being added to the PSD is compared using the XOR operator with the existing composite symmetric key, which results in a new composite symmetric key, which replaces the existing composite symmetric key. This process repeats each time the key replacement mechanism is employed.

In order for the third party to reconstruct the successively generated composite symmetric keys, it is necessary for each key installer (manufacturer, issuer, and subsequent service providers) to send their individual cryptographic keys to the third party who will reconstruct the current composite symmetric key using each installer's keys and the XOR operator as is performed in the PSD. Transfers of each installer's cryptographic keys (or sufficient information to reconstruct them) to the third party are assumed to occur out of band using for example a courier service. Other secure transfer methods will work as well. In most instances, the cryptographic information transfers may include information for a large number of PSDs, which are cross-referenced by each PSDs internal serial numbers.

An example of how the generated symmetric key may be employed is demonstrated in co-pending U.S. patent application Ser. No. 09/892,904 filed on Jun. 28, 2001, entitled "A Method And System For Generating And Verifying A Key Protection Certificate", assigned to the assignee of the present invention and designated thereafter patent application ELS-1. In patent application ELS-1, a symmetric key is used in a keyed message digest as part of a cryptogram. The cryptogram forms part of the proof used by a third party that keys are maintained and protected by a PSD and not publicly disclosed.

By reducing the trust relationships between all parties involved in managing cryptographically protected information installed in a PSD, the strength of the composite symmetric key is significantly improved since no one party other than the designated third party has the ability to generate the composite symmetric key. A certificate, which incorporates the composite symmetric key generated by the technique described in this patent application, provides greater assurances that the overall integrity and authenticity of the PSD has not been compromised.

Another example of how the generated symmetric key may be employed is demonstrated in co-pending U.S. patent application Ser. No. 09/880,795 filed on Jun. 15, 2001, entitled "Method, System And Apparatus For A Portable Transaction Device", assigned to the assignee of the present invention and designated thereafter patent application JBE-1. In patent application JBE-1, a pseudo-random number is sent to a remote terminal in which a PSD is installed as part of an authentication challenge. In order to properly respond to the authentication challenge it is necessary to process the challenge using a predetermined cryptography method. This system allows a third party to outsource telecommunications and other requirements to separate service providers.

DETAILED DESCRIPTION OF PREFERRED EMBODIMENT

In this invention, a shared secret (symmetric) key is created and stored in conjunction with sequential cryptographic key replacements. Only a trusted and independent third party knows the shared secret symmetric key, which is reconstructed from keys securely supplied to the trusted third party from a plurality of sources using the identical algorithm included in a PSD.

In the preferred embodiment of the invention, a PSD issuer centric management system is employed which requires authorization by the issuer in order for another service provider to install applications in the PSD. In another embodiment of the invention, a end user centric management system is employed which allows service providers to install applications in the PSD without prior approval but conforming to the requirements of the PSD issuer.

Figure 1:
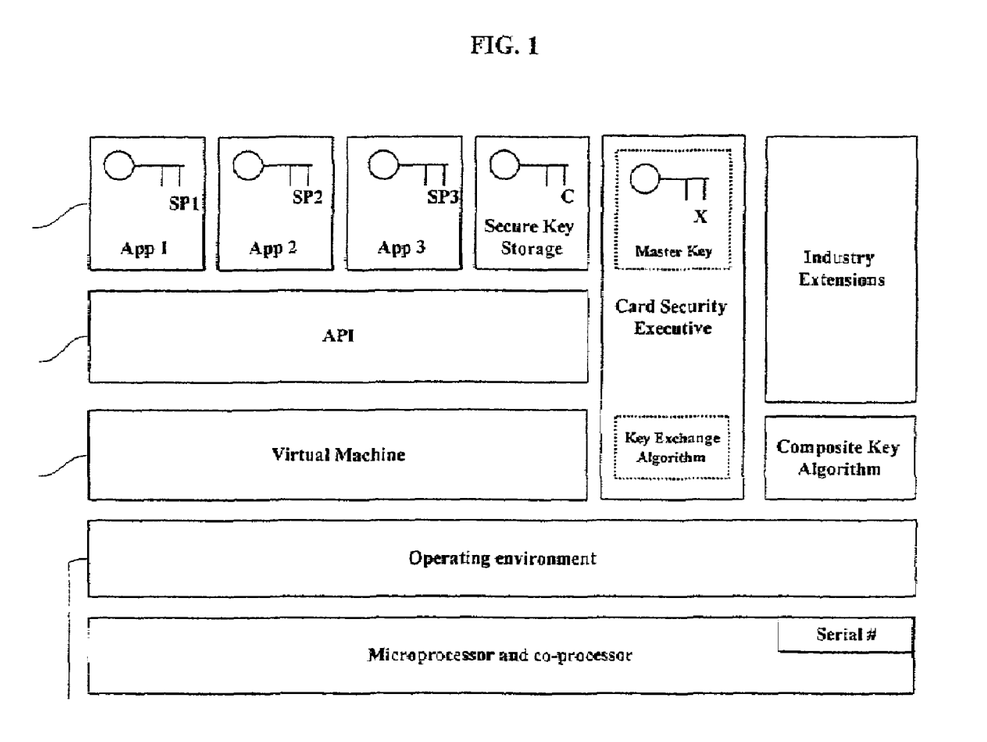
FIG. 1—is a general system block diagram for implementing the present invention.

Referring to FIG. 1, a typical arrangement of a PSD is depicted where separate applications and cryptographic keys are stored within secure domains (App 1 and cryptographic key SP1 in secure domain 5, App 2 and cryptographic key SP2 in secure domain 10, App 3 and cryptographic key SP3 in secure domain 15) and a composite cryptographic key C is installed within a secure key storage domain 20.

A card executive 25 which controls the PSD includes such as functions as loading and deleting applications, cryptographic key exchanges 55 and routing commands to a selected application information. In an issuer centric management system, the card executive is cryptographically protected by an issuer master key X 30, which restricts access to the PSD. In an end user centric management system, the card executive is not cryptographically protected, but may be provided with fewer access privileges for security purposes.

Industry extensions 35 are optionally included which provide customized algorithms and data to support a particular industry. For example, the financial services industry adds a number of industry extensions, which allows the PSD to securely operate with a wide variety of different financial service providers.

An applications programming interface (API) 40 is included which allows installed applications to interact with internal services, shared data and available industry extensions.

A composite key-generating algorithm 45 is included which generates a secret key based on sequential injections of keys belonging to other providers. This algorithm is installed during the masking phase by the PSD manufacturer and is not under the control of the card executive 25.

A virtual machine 50 is included which allows installed applications to be interpreted and executed by the operating environment 60.

An operating environment 60 is included which allows access in a secure and controlled manner to the internal microprocessor, co-processor and any installed native methods.

A unique serial number 65 is generated and stored during the PSD masking process, which is common and accessible to all domains but unalterable for the life of the PSD.

Lastly, the physical layer 70 includes the microprocessor and co-processor, which executes the instructions received through the operating environment 60.

Figure 2A:
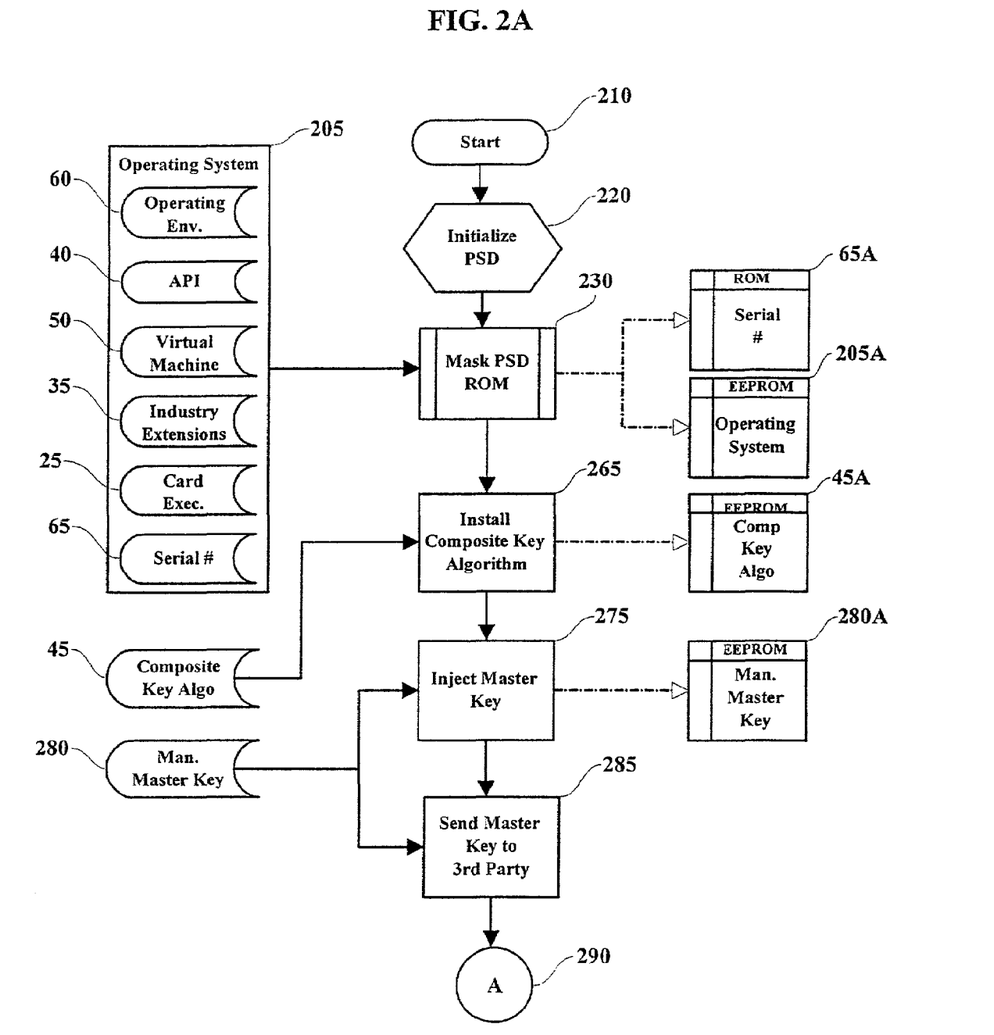
FIG. 2A—is a flow chart illustrating the inclusion of a composite key-generating algorithm during masking of a personal security device.

FIG. 2A depicts the masking process, which includes installation of the operating system, composite key generating algorithm and serial number. The process is initiated 210 by the PSD manufacturer by initializing 220 a PSD, masking the internal PSD ROM 230 with the operating system 205. The operating system includes the operating environment 60, applications programming interface (API) 40, virtual machine 50, optional industry extensions 35, card executive 25 and a unique serial number 65.

The masking process installs the operating system 205A, less the serial number, in EEPROM. The serial number 65A is installed in non-mutable ROM. Once the operating system has been installed, the composite key-generating algorithm 45 is installed 45A in EEPROM.

The last step in the manufacturing process is installation of a PSD master key. The master key 280 is injected 275 into the PSD and securely stored in EEPROM 280A using the card executive. The manufacturer's master key is injected into the PSD rather than internally generated in order to save valuable storage space and improve the speed of the manufacturing process. Each PSD receives a unique master key generated externally and cross-referenced by the PSD's non-mutable serial number. The master key 280, cross-referenced by the PSDs serial number 65 is then securely sent 285 to a trusted third party for eventual generation of an identical composite key. The composite key generating process continues 290 as depicted in FIG. 2B.

Figure 2B:
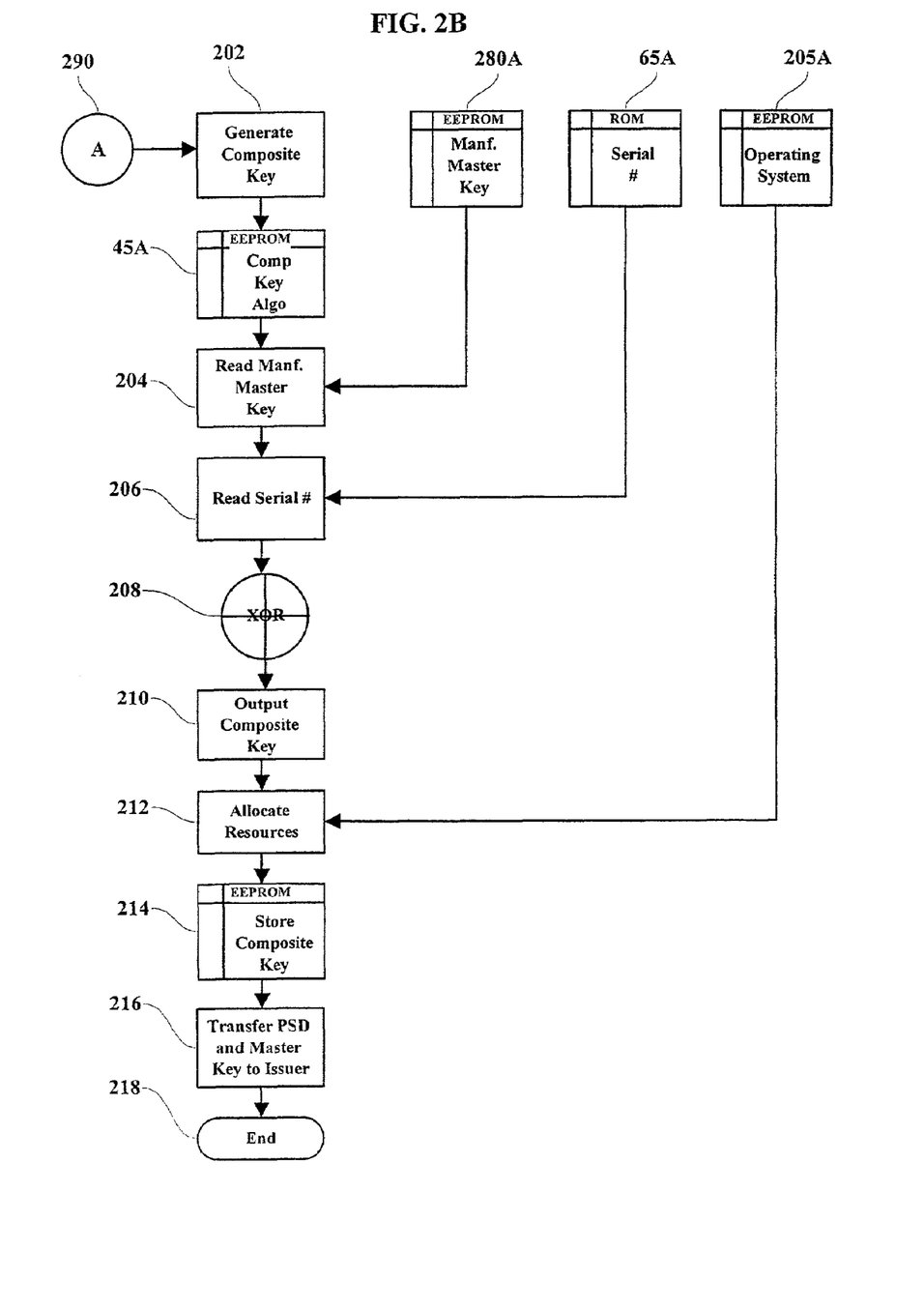
FIG. 2B—is a flow chart illustrating generation of a composite key using an injected PSD manufacturer master key and device serial number.

FIG. 2B depicts the generation and secure storage of the initial composite key. Once the master key has been injected as described above, the composite key generating process continues 290 by calling 202 the composite key generating algorithm 45A, reading 204 the manufacturer's master key 280A from its storage location in EEPROM, reading 206 the PSD's serial number 65A from its storage location in ROM, performing an exclusive OR (XOR) 208 comparison at the machine level between the manufacturer's master key 280A and the PSD's serial number 65A, outputting the composite key results 210, allocating storage resources 212 using the operating system 205A and securely storing the composite key in EEPROM 214. The PSD and master key are then sent to PSD issuer for personalization 216, which completes the composite key generating process 218. The use of XOR arithmetic function to generate a new composite key may be replaced using 3DES or other cryptographic or arithmetic functions, which will generate a new unique symmetric key based on existing key information.

Figure 3A:
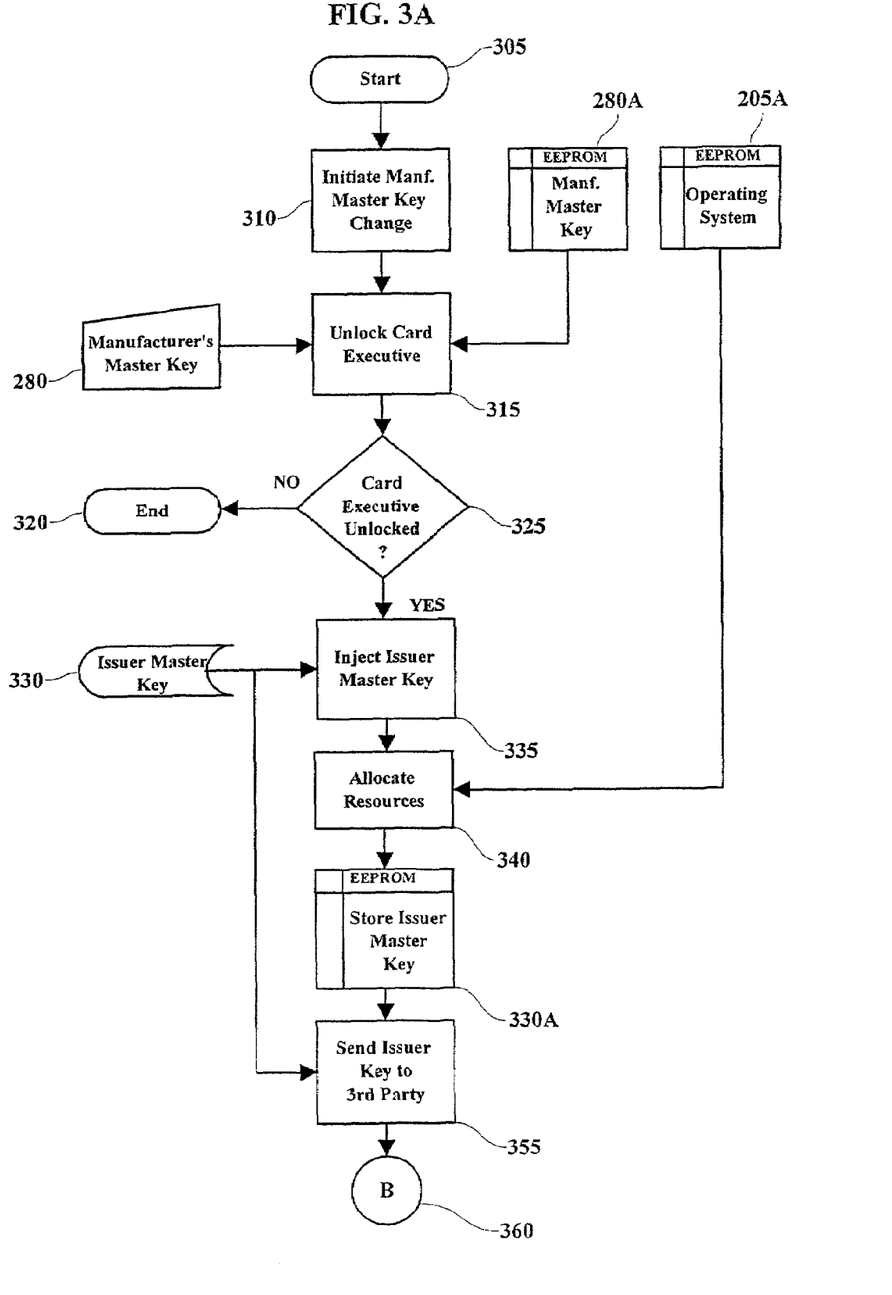
FIG. 3A—is a flow chart illustrating key replacement of a manufacturer's key with a PSD issuer master key.

FIG. 3A depicts the personalization process in which the PSD manufacturer's master key is replaced by the PSD issuer master key. The process is initiated 305 by selecting 310 the key replacement algorithm component included in the card executive. In issuer centric management systems, which is the preferred embodiment of the invention, the card executive is cryptographically protected which requires the card executive to be unlocked 315 using the manufacturers master key 280. The entered master key 280 is compared 325 with the stored master key 280A; if the keys do not match, processing ends 320; if the keys match, the card executive allows a new issuer master key 330 to be injected 335 which replaces the PSD manufacturer's master key.

Resources are allocated 340 using the PSD operating system 205A, which allows the issuer's master key to be stored 330A in EEPROM. A copy of the issuer's master key, cross referenced by PSD serial number, is then securely sent 355 to the trusted third party for use in generating an identical composite key. Processing continues B 360 within the PSD to generate a new composite key.

Figure 3B:
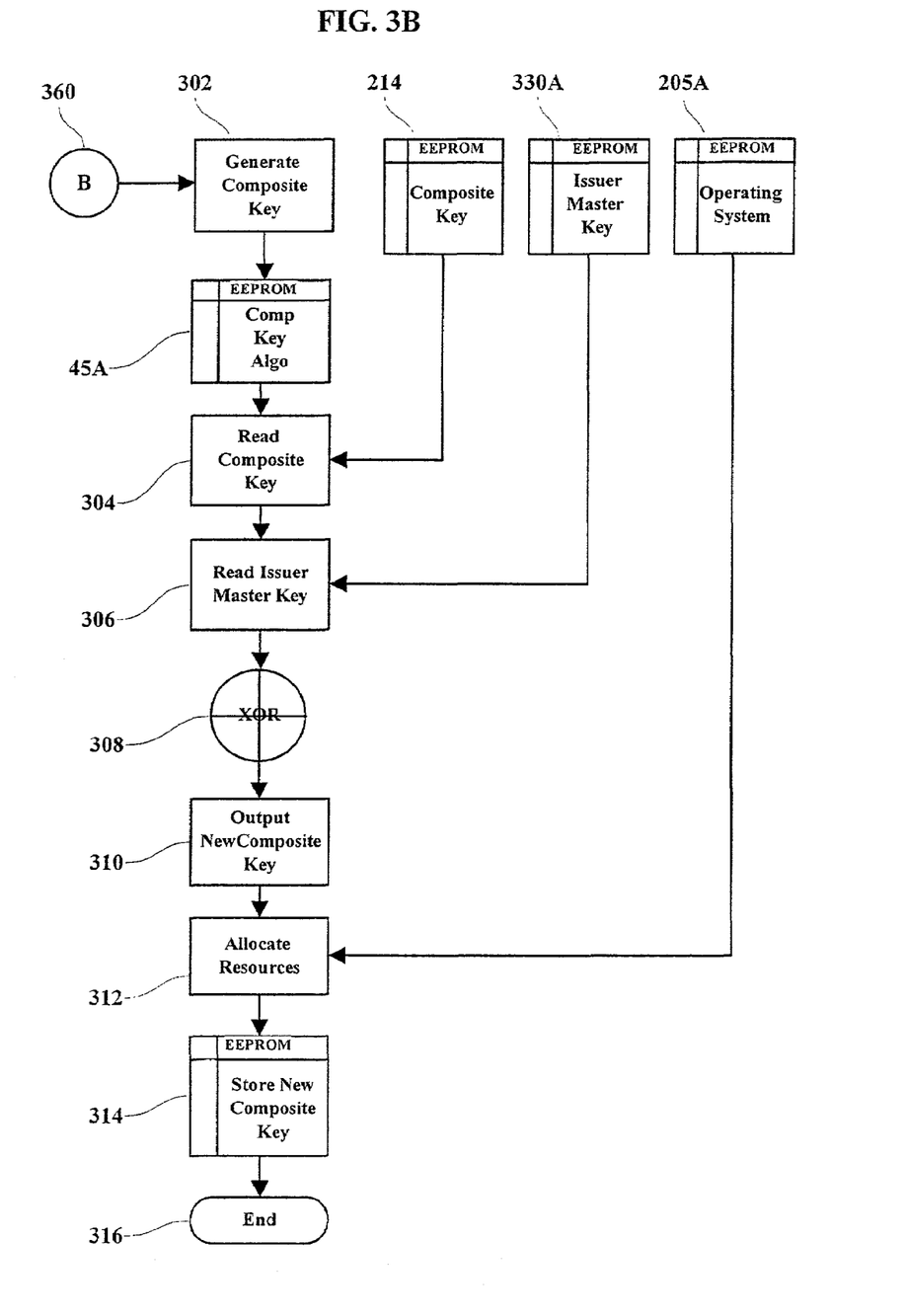
FIG. 3B—is a flow chart illustrating generation of a composite key using the existing composite key and the injected PSD issuer master key.

FIG. 3B depicts the generation and secure storage of a new composite key. Once the issuer master key has been injected as described above, the composite key generating process continues B 360 by calling 302 the composite key generating algorithm 45A, reading 304 the current composite key 214 from its storage location in EEPROM, reading 306 the issuer's master key 330A from its storage location in EEPROM, performing 308 an exclusive OR (XOR) comparison at the machine level between the issuer's master key 330A and the current composite key 214, outputting the composite key results 310, allocating storage resources 312 using the operating system 205A and securely storing 314 the composite key in EEPROM which ends 316 the process.

Figure 4A:
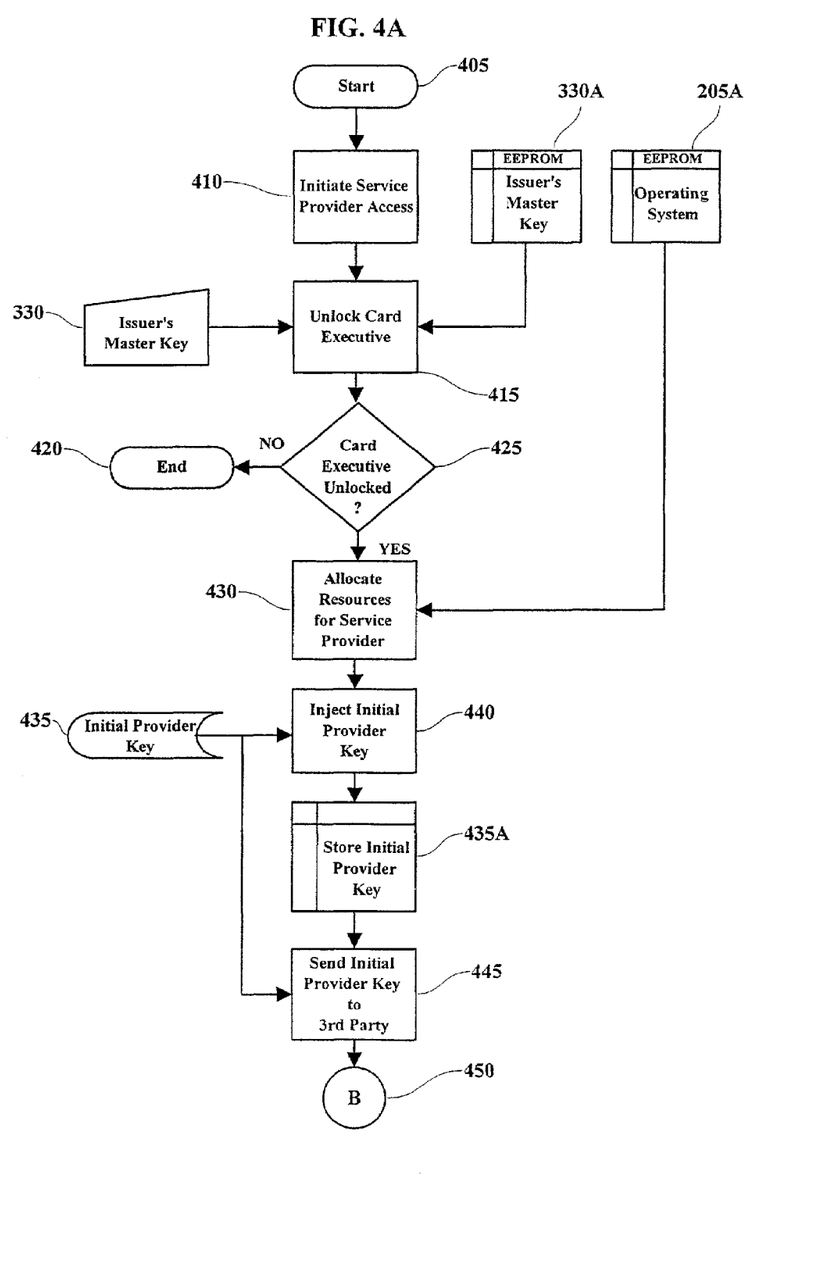
FIG. 4A—is a flow chart illustrating PSD issuer authorized key generation and PSD resource allocation for a service provider.

FIG. 4A depicts the addition of an unrelated service provider key to the PSD by an issuer centric PSD issuer. The process is initiated 405 by selecting 410 the key change algorithm component included in the card executive. As before, the card executive is cryptographically protected which requires the card executive to be unlocked 415 using the issuer's master key 330. The entered master key 330 is compared 425 with the stored master key 330A; if the keys do not match, processing ends 420; if the keys match, the card executive allows the issuer to allocate resources 430 for use by the service provider and injects 440 an initial service provider key 435. The service provider key 435 is either generated by the PSD issuer or received from the service provider for injection. For consistency with the issuer centric preferred embodiment, it is assumed that the PSD issuer generates the initial service provider key.

The PSD issuer causes the initial service provider key to be stored 435A in EEPROM. A copy of the initial service provider key, cross referenced by PSD serial number is then securely sent 445 to the trusted third party for use in generating an identical composite key. Processing continues B 450 within the PSD to generate a new composite key.

Figure 4B:
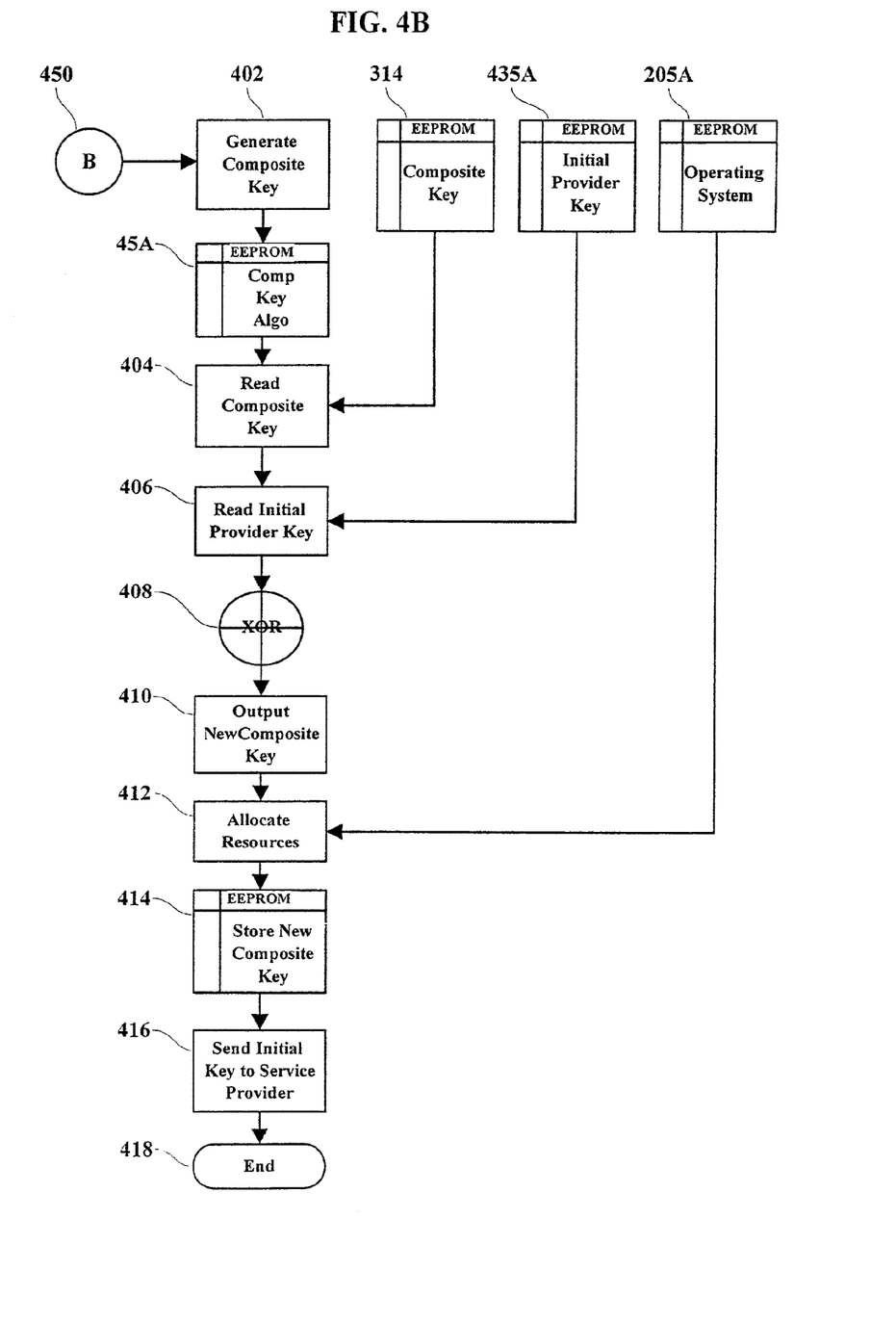
FIG. 4B—is a flow chart illustrating generation of a composite key using the existing composite key and an injected service provider key.

FIG. 4B depicts the generation and secure storage of a second new composite key. Once the issuer has injected the initial service provider key as described above, the composite key generating process continues B 450 by calling 402 the composite key generating algorithm 45A, reading 404 the current composite key 314 from its storage location in EEPROM, reading 406 the initial service provider key 435A from its storage location in EEPROM, performing 408 an exclusive OR (XOR) comparison at the machine level between the initial service provider key 435A and the current composite key 314, outputting 410 the new composite key, allocating storage resources 412 using the operating system 205A and securely storing 414 the new composite key in EEPROM. A copy of the initial service provider key, cross referenced by PSD serial number is then securely sent 416 to the service provider for use in accessing the PSD following PSD issuance to an end user. This completes 418 the basic composite key generation cycle. Future post issuance service providers will be installed and composite keys generated as described herein.

Figure 5:
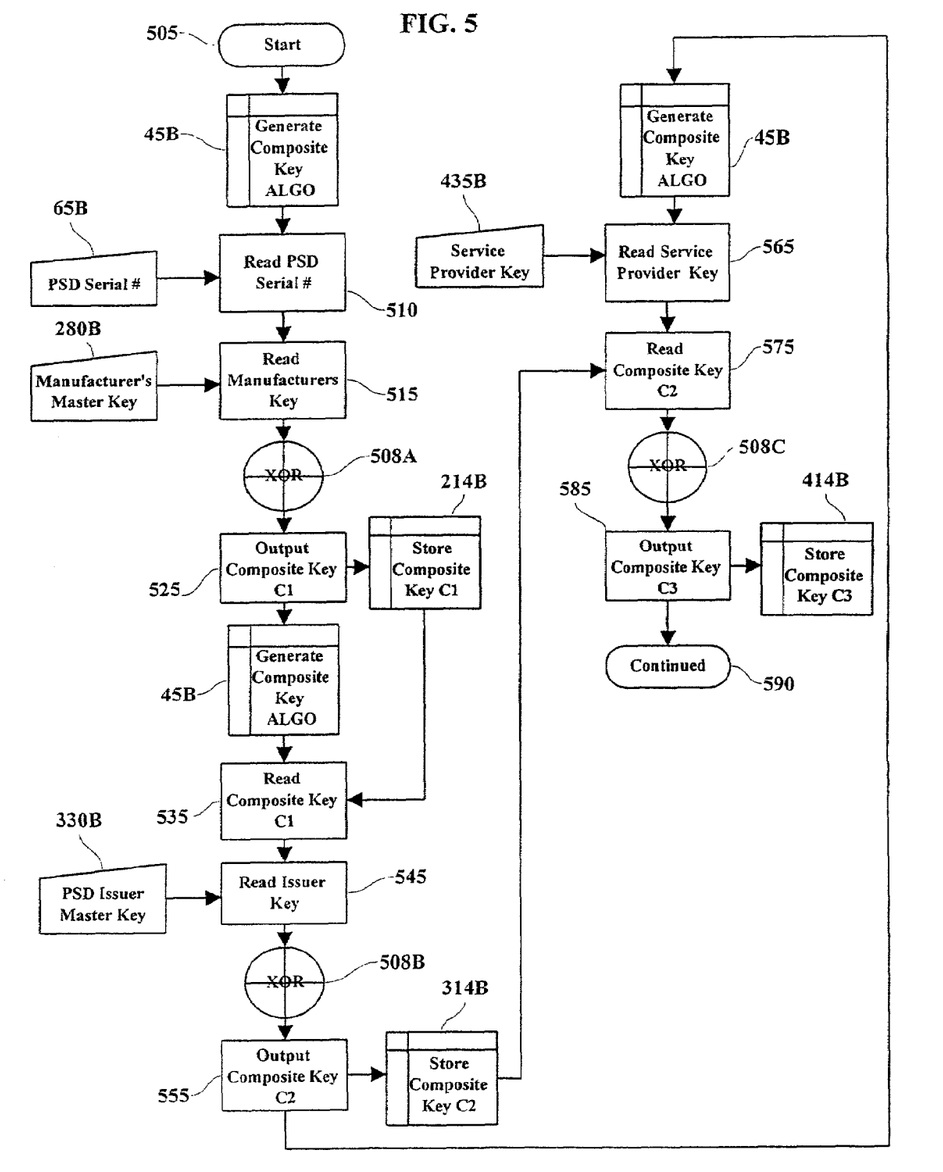
FIG. 5—is a flow chart illustrating generation of a composite key by the trusted third party using the information supplied by the PSD manufacturer, PSD issuer and a service provider.

FIG. 5 depicts the parallel composite key generation performed by a trusted third party who is in receipt of all injected keys as described above. The composite key generating process is initiated 505 by calling the equivalent composite key generating algorithm 45B employed in the PSD. The PSD serial number 65B is entered and read 510, which provides a cross-reference to the correct manufacturer's master key 280B, which is also read 515.

An exclusive OR (XOR) comparison is performed 508A on the PSD serial number 65B and manufacturer's master key, outputting the first composite key results 525 and storing 214B the resulting composite key. After receiving the PSD issuer master key 330B, the processing continues utilizing the composite key generating algorithm 45B, reading 535 the stored 214B composite key C1, reading 545 the PSD issuer key 330B, performing 508B an exclusive OR (XOR) comparison between the composite key 214B and the issuer's master key 330B. A new composite key C2 is outputted 555 and stored 314B as before.

After receiving the service provider's key 435B, the processing continues utilizing the composite key generating algorithm 45B, reading 565 the service provider's key 435B, reading 575 the stored composite key 314B, performing 508C an exclusive OR (XOR) comparison between the composite key 314B and the service provider's key 435B. A new composite key C3 is outputted 585 and stored 414B as before. This process continues 590 for each additional service provider who installs services on the PSD, thus providing an ongoing record of all applications installed in the PSD since manufacture.

Figure 6:
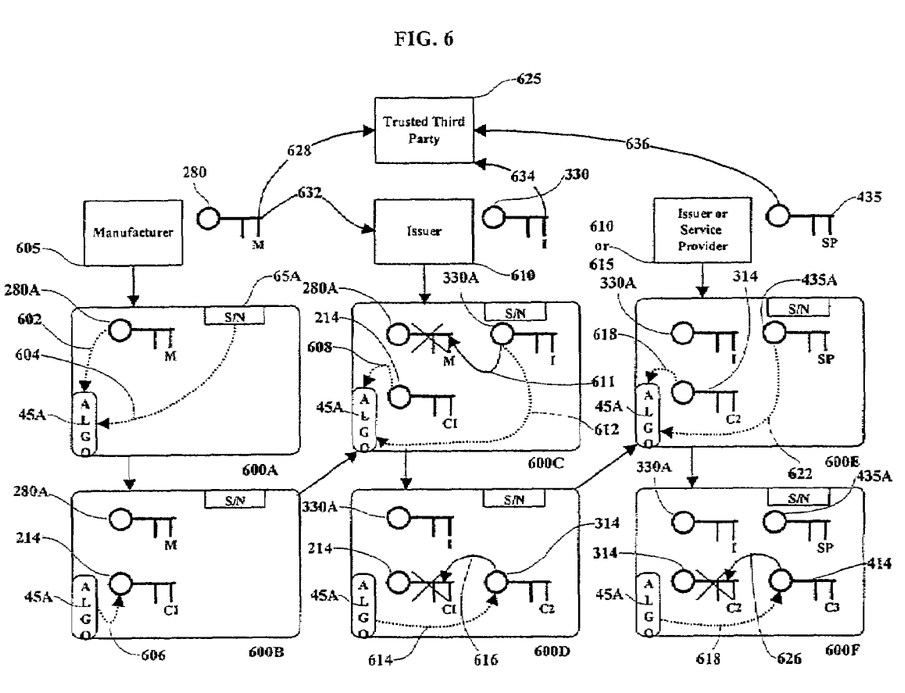
FIG. 6—is a detailed block diagram illustrating the transfer of keys to a trusted third party and sequential generation of composite keys following the sequential injection of keys from a plurality of sources.

FIG. 6 is a detailed block diagram, which provides an overview of the entire preferred embodiment of the invention. PSD 600A receives an initial master key M 280 which is injected 280A into the PSD 600A by the PSD manufacturer 605 following masking. The composite key generating algorithm 45A reads 602 the injected key 280A and 604 the PSD serial number 65A and generates 606 a first composite key 214 as is shown in PSD 600B.

The PSD manufacturer 605 then securely forwards 632 the PSD as is shown in PSD 600 C and master key 280 to the PSD issuer 610 and securely sends 628 a copy of the master key 280 to the Trusted Third Party 625. The PSD issuer 610 unlocks the card executive using the master key 280 provided by the PSD manufacturer 605, replaces 611 the manufacturer's master key 280A with the issuer's master key 330A.

The composite key generating algorithm 45A reads 612 the injected issuer's master key 330A and 608 the current composite key 214 and generates 614 a second composite key 314 as is shown in PSD 600D. The second composite key 314 replaces 616 the first composite key 214. The PSD issuer 610, upon completion of processing, securely sends 634 a copy of the issuer's master key 330 to the Trusted Third Party 625.

In PSD 600 E, in an issuer centric arrangement, the PSD issuer 610 injects 435A a service provider's key 435 into the PSD. In an open platform arrangement, the service provider 615 injects 435A the service provider's key 435. In either arrangement, the key generating algorithm 45A reads 622 the injected service provider's key 435A, reads 618 the current composite key 314 and generates 618 a new composite key 414 as is shown in PSD 600F. The new composite key 414 replaces 626 the existing composite key 314. Either the PSD issuer or Service Provider securely sends 636 a copy of the service provider's key 435 to the Trusted Third Party 625.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

Other variations and embodiments are possible in light of above teachings, and it is not intended that this Detailed Description limit the scope of invention, but rather by the claims following herein.

What is claimed is:

1. A data processing system for generating a unique symmetric cryptographic key using data stored inside a PSD from a plurality of separate sources, said system comprising:

a PSD including a non-mutable unique serial number, an operating system, data processing means, data storage means, communications means and cryptography means;

a PSD manufacturer including data processing means, communications means and cryptography means, wherein said PSD manufacturer operatively and securely installs a composite key generating algorithm and a first symmetric key inside said PSD, causing a first composite key to be generated and securely stored inside said PSD using said first symmetric key and said serial number as inputs into said composite key generating algorithm;

at least one secure transfer arrangement, wherein said PSD manufacturer sends said PSD and a copy of said first symmetric key and said PSD serial number to a PSD issuer and another copy of said first symmetric key and said serial number to a trusted third party;

said PSD issuer including data processing means, communications means and cryptography means, wherein said PSD issuer operatively and securely installs a second symmetric key inside said PSD using said first symmetric key to gain access to said PSD, causing a second composite key to be generated and securely stored inside said PSD using said first composite key and said second symmetric key as inputs into said composite key generating algorithm;

said at least one secure transfer arrangement, wherein said PSD issuer sends a copy of said second symmetric key and said serial number to said trusted third party;

said trusted third party in secure receipt of said first symmetric key and said serial number, wherein said trusted third party using an equivalent composite key generating algorithm to said PSD key generating algorithm generates said first duplicate composite key using said first symmetric key and said serial number as inputs into said equivalent composite key generating algorithm; and said trusted third party in secure receipt of said second symmetric key and said serial number, wherein said trusted third party using said equivalent composite key generating algorithm generates said second duplicate composite key using said first duplicate composite key and said second symmetric key as inputs into said equivalent composite key generating algorithm.

2. The system according to claim 1, wherein said second symmetric key replaces said first symmetric key.

3. The system according to claim 1, wherein said second composite key replaces said first composite key.

4. The system according to claim 1, wherein said second duplicate composite key replaces said first duplicate composite key.

5. The system according to claim 1, wherein said secure transfer arrangement includes postal service, private courier and secure electronic transmission.

6. The system according to claim 1, wherein a third cryptographic key is securely installed inside said PSD causing a third composite key to be generated and securely stored inside said PSD using said second composite key and said third cryptographic key as inputs into said composite key generating algorithm.

7. The system according to claim 6, wherein said third cryptographic key is installed by said PSD issuer.

8. The system according to claim 6, wherein said third cryptographic key is installed by at least one service provider.

9. The system according to claim 7 or 8, wherein said third cryptographic key and said PSD serial number is sent using said at least one secure transfer arrangement to said trusted third party.

10. The system according to claim 9, wherein said trusted third party using said equivalent composite key generating algorithm generates said third duplicate composite key using said second duplicate composite key and said third cryptographic key as inputs into said equivalent composite key generating algorithm.

11. The system according to claim 10, wherein said third duplicate composite key replaces said second duplicate composite key.

12. The system according to claim 1 or 6, wherein a new cryptographic installed in said PSD causes a new composite key to be generated using a current composite key and said new cryptographic key as inputs into said composite key generating algorithm.

13. The system according to claim 12, wherein said new cryptographic key and said PSD serial number is sent using said at least one secure transfer arrangement to said trusted third party.

14. The system according to claim 13, wherein said trusted third party using said equivalent composite key generating algorithm generates a new duplicate composite key using a current duplicate composite key and said new cryptographic key as inputs into said equivalent composite key generating algorithm.

15. The system according to claim 12, wherein said new composite key replaces said current composite key.

16. The system according to claim 14, wherein said new duplicate composite key replaces said current duplicate composite key.

17. A method of generating a unique symmetric cryptographic key using data stored inside an operable PSD including a unique serial number, from a plurality of separate sources, said method comprising:

securely installing a composite key generating algorithm inside said PSD, wherein said composite key generating algorithm is known to a trusted third party, securely installing a first symmetric key inside said PSD by a PSD manufacturer, generating a first composite key by executing said composite key generating algorithm using said unique serial number and said first symmetric key as inputs into said composite key generating algorithm, securely storing said first composite key inside said PSD, sending a copy of said first symmetric key, said unique serial number and said PSD to a PSD issuer using at least one secure transfer arrangement, sending a copy of said first symmetric key and said unique serial number to said trusted third party using said at least one secure transfer arrangement, accessing said PSD using said first symmetric key by said PSD issuer, securely installing a second symmetric key by said PSD issuer, generating a second composite key by executing said composite key generating algorithm using said first composite key and said second symmetric key as inputs into said composite key generating algorithm, securely storing said second composite key inside said PSD, sending a copy of said second symmetric key and said unique serial number to said trusted third party using said at least one secure transfer arrangement, securely receiving said first symmetric key and said unique serial number by said trusted third party, generating a first duplicate composite key by said trusted third party using an equivalent composite key generating algorithm, said first symmetric key and said unique serial number as inputs into said equivalent composite key generating algorithm, securely receiving said second symmetric key and said unique serial number by said trusted third party, generating a second duplicate composite key by said trusted third party using said equivalent composite key generating algorithm and said second symmetric key as inputs into said equivalent composite key generating algorithm.

18. The method according to claim 17, further including replacing said second symmetric key with said first symmetric key.

19. The method according to claim 17, further including replacing said second composite key with said first composite key.

20. The method according to claim 17, further including replacing said second duplicate composite key with said first duplicate composite key.

21. The method according to claim 17, wherein said secure transfer arrangement includes postal service, private courier and secure electronic transmission.

22. The method according to claim 17 further including;
securely installing a third cryptographic key inside said PSD;
generating a third composite key using said second composite key and said third cryptographic key as inputs into said composite key generating algorithm;
securely storing said third composite key inside said PSD.

23. The method according to claim 22, wherein said third cryptographic key is installed by said PSD issuer.

24. The method according to claim 22, wherein said third cryptographic key is installed by at least one service provider.

25. The method according to claim 23 or 24, further including sending said third cryptographic key and said PSD serial number to said trusted third party using said at least one secure transfer arrangement.

26. The method according to claim 25 further including; generating a third duplicate composite key by said trusted third party, using said second duplicate composite key and said third cryptographic key as inputs into said equivalent composite key generating algorithm.

27. The method according to claim 26 further including, replacing said second duplicate composite key with said third duplicate composite key.

28. The method according to claim 17 or 22, wherein installing a new cryptographic key into said PSD causes a new composite key to be generated using a current composite key and said new cryptographic key as inputs into said composite key generating algorithm.

29. The method according to claim 28 further including, sending said new cryptographic key and said PSD serial number to said trusted third party using said at least one secure transfer arrangement.

30. The method according to claim 29 further including, generating a new duplicate composite key by said trusted third party using a current duplicate composite key and said new cryptographic key as inputs into said equivalent composite key generating algorithm.

31. The method according to claim 28 further including, replacing said current composite key with said new composite key.

32. The method according to claim 30 further including, replacing said current duplicate composite key with said new duplicate composite key.

* * * * *